(12) United States Patent
Zhang et al.

(10) Patent No.: US 11,208,872 B2
(45) Date of Patent: Dec. 28, 2021

(54) CCUS (CARBON CAPTURE UTILIZATION AND STORAGE) SYSTEM FOR EXPLOITING THICKENED OIL RESERVOIRS BASED ON OPTIMAL FLUE GAS $CO_2$ ENRICHMENT RATIO AND WORKING METHOD THEREOF

(71) Applicant: CHINA UNIVERSITY OF PETROLEUM, Qingdao (CN)

(72) Inventors: Chao Zhang, Qingdao (CN); Zhaomin Li, Qingdao (CN); Jianlin Liu, Qingdao (CN); Dongya Zhao, Qingdao (CN); Teng Lu, Qingdao (CN); Shouya Wu, Qingdao (CN); Longjiang Guo, Qingdao (CN)

(73) Assignee: CHINA UNIVERSITY OF PETROLEUM, Qingdao (CN)

(*) Notice: Subject to any disclaimer, the term of this patent is extended or adjusted under 35 U.S.C. 154(b) by 488 days.

(21) Appl. No.: 16/331,929

(22) PCT Filed: Aug. 3, 2018

(86) PCT No.: PCT/CN2018/098456
§ 371 (c)(1),
(2) Date: Mar. 8, 2019

(87) PCT Pub. No.: WO2019/056870
PCT Pub. Date: Mar. 28, 2019

(65) Prior Publication Data
US 2021/0324716 A1  Oct. 21, 2021

(30) Foreign Application Priority Data
Sep. 25, 2017 (CN) .......................... 201710877108.2

(51) Int. Cl.
E21B 43/16 (2006.01)
E21B 43/40 (2006.01)
E21B 41/00 (2006.01)

(52) U.S. Cl.
CPC ........ *E21B 41/0064* (2013.01); *E21B 43/164* (2013.01); *E21B 43/40* (2013.01)

(58) Field of Classification Search
CPC ..... E21B 41/0064; E21B 43/164; E21B 43/40
See application file for complete search history.

(56) References Cited

U.S. PATENT DOCUMENTS

| | | | |
|---|---|---|---|
| 7,341,102 B2* | 3/2008 | Kresnyak | E21B 43/2406 166/267 |
| 8,460,444 B2* | 6/2013 | Zhang | B01D 53/1437 96/121 |
| 10,605,058 B2* | 3/2020 | Myhr | C09K 8/594 |

* cited by examiner

*Primary Examiner* — D. Andrews
(74) *Attorney, Agent, or Firm* — CBM Patent Consulting, LLC

(57) ABSTRACT

A CCUS system for exploiting a thickened oil reservoir based on an optimal flue gas $CO_2$ enrichment ratio. The CCUS system comprises a flue gas $CO_2$ enrichment unit, a flue gas injection unit, a thickened oil thermal production well group unit and a produced gas recovery unit; the fuel gas $CO_2$ enrichment unit comprises an air separating enrichment unit and a boiler injection gas premixed tank; the air separating enrichment unit comprises an air separating primary device used for separating air into oxygen and nitrogen preliminarily, and an air separating secondary device used for further enriching a part of the oxygen which is subjected to the preliminary separation; and the boiler injection gas premixed tank is used for mixing the preliminarily separated nitrogen, the preliminarily separated part of the oxygen and/or the further enriched oxygen.

8 Claims, 1 Drawing Sheet

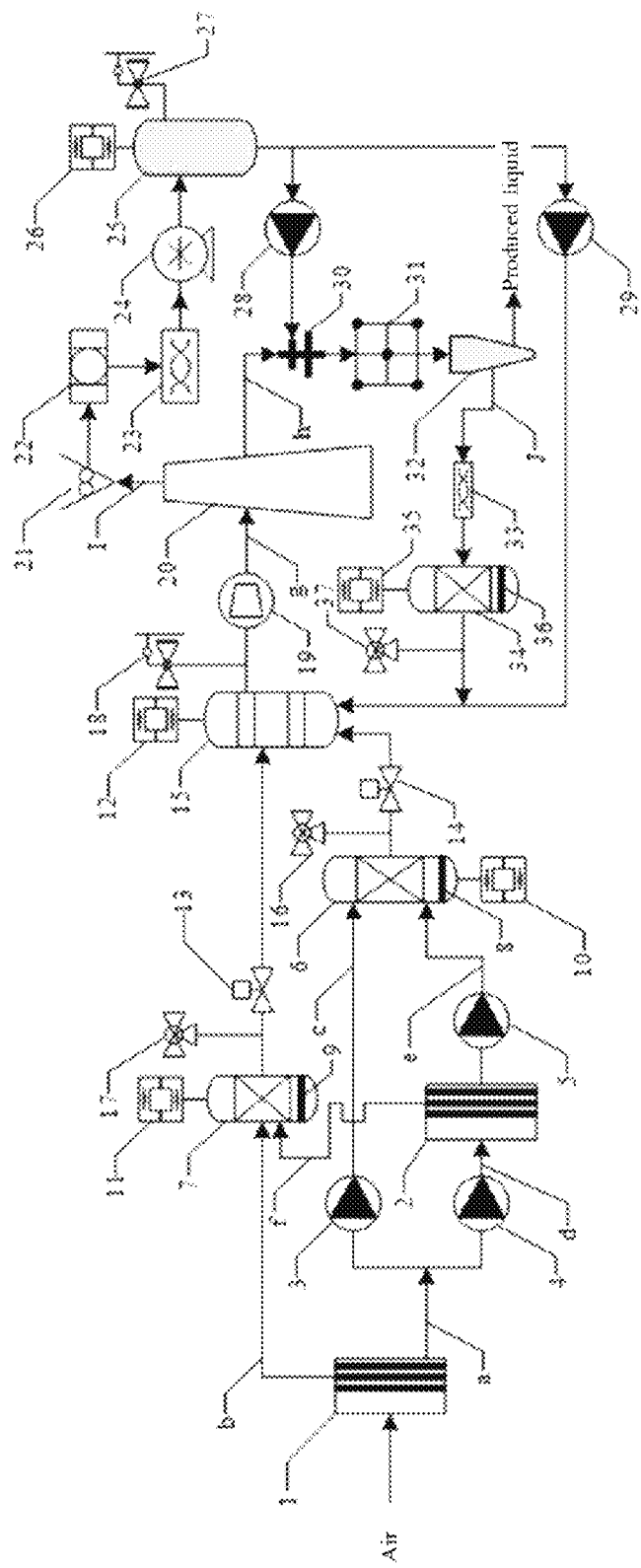

CCUS (CARBON CAPTURE UTILIZATION AND STORAGE) SYSTEM FOR EXPLOITING THICKENED OIL RESERVOIRS BASED ON OPTIMAL FLUE GAS $CO_2$ ENRICHMENT RATIO AND WORKING METHOD THEREOF

BACKGROUND OF THE INVENTION

Technical Field

The invention relates to a Carbon Capture Utilization & storage (CCUS) system for exploiting a thickened oil reservoir based on an optimal flue gas $CO_2$ enrichment ratio and a working method thereof and belongs to the technical field of thickened oil thermal production and $CO_2$ gathering, utilization and buried storage.

Description of Related Art

*Action Plan for Energy Technology Revolution and Innovation* (2016-2030), jointly issued by NDRC (National Development and Reform Commission) and National Energy Administration in Apr. 2016, defines the overall goals of Chinese revolution in energy technology, including two significant tasks: "clean and efficient coal utilization technology innovation" and "$CO_2$ capturing, utilization and storage technology innovation", and aims at greatly reducing pollutant discharge in the energy production process greatly, providing a more environment-friendly energy technology support and building a green and low-carbon energy technology system.

The coal accounts for more than 60% of the Chinese energy structural composition. Flue gas, produced by coal-fired power plants as a major user of coal, is the primary discharge source of $CO_2$. High amounts of $CO_2$ discharge is contrary to the fulfillment of a carbon emission reduction promise of China. CCUS (Carbon Capture, Utilization and Storage) refers to a carbon capturing, utilization and storage technology, which has gradually developed into an important emerging industry in the domestic and overseas energy fields and is generally at a research & development and demonstration stage. The capturing technology of an overseas CCUS project takes on diversified trends such as pre-combustion, after-combustion and oxygen enrichment, and the storage type is mainly dominated by oil replacement and secondarily dominated by salt water storage. The domestic CCUS has developed basic theory research, technology research & development and engineering demonstration. On the whole, CCUS has formed a development direction with an oil replacement-oriented technology line in which carbon capturing is carried out after combustion with the technical path of reducing the capturing energy consumption and increasing the $CO_2$ economic benefits.

The Chinese patent ZL201510227342.1 refers to the development of a thickened oil reservoir accounting for more than about 20% of Chinese total petroleum resources and mainly depends on the thermal force of oil production technologies such as cyclic steam huff and puff, steam flooding, hot water driving, and steam auxiliary gravity discharge (SAGD), but the high amounts of boiler flue gas produced in the thermal force development process will inevitably become the main field of the CCUS technology application.

Related research about CCUS at home and abroad gives priority to highly pure $CO_2$, that is, the first step of realizing CCUS certainly is how to solve the 100% capturing of the $CO_2$. E.g., it is referred to by the Chinese patent ZL201510201327.X that the current $CO_2$ capturing purification technology mainly regards an absorption tower and a desorption tower as a main body, the energy consumption in the absorption and desorption processes is relatively high, the energy utilization ratio of the flue gas $CO_2$ capturing recovery system is increased through seven thermal exchanges in the patent, the demand on the external public for engineering heat during the desorption is reduced, and the $CO_2$ capturing purification energy consumption is further reduced, but the $CO_2$ capturing process still has the features of high energy consumption, high cost, and restricts the development of CCUS.

In the boiler flue gas, the $CO_2$ accounts for about 15% and $N_2$ accounts for about 80%, so that the flue gas has the double principles of $N_2$ and $CO_2$ displacement. How to determine the optimal proportion of $CO_2$ and $N_2$, that is, the flue gas $CO_2$ enrichment ratio, and finally realize the reduction of the $CO_2$ capturing energy consumption and the $CO_2$ oil displacement effect collaboratively are the core problems desired to be solved by the current CCUS; and the flue gas $CO_2$ enrichment ratio is the proportion of the $CO_2$ in the flue gas, which can realize efficient oil replacement, further guide the flue gas $CO_2$ enrichment degree, and reduce the $CO_2$ capturing cost as far as possible.

BRIEF SUMMARY OF THE INVENTION

Aiming at the disadvantages of the prior art, the invention provides a CCUS system for exploiting a thickened oil reservoir based on an optimal flue gas $CO_2$ enrichment ratio.

The invention also provides a working method for the CCUS system.

The invention further promotes large-scale application of the CCUS technology in the field of thickened oil thermal production, changes $CO_2$ capturing into $CO_2$ enrichment, realizes the reduction of the $CO_2$ capturing energy consumption and improvement of the $CO_2$ oil-driving effect synergistically, and further realizes cost reduction and effect increase of the whole CCUS process.

The Technical Scheme of the Invention is as Follows:

A CCUS system for exploiting the thickened oil reservoir based on the optimal flue gas $CO_2$ enrichment ratio, characterized by comprising a flue gas $CO_2$ enrichment unit, a flue gas injection unit, a thickened oil thermal production well group unit and a produced gas recovery unit;

the fuel gas $CO_2$ enrichment unit comprises an air separating enrichment unit and a boiler injection gas premixed tank;

the air separating enrichment unit comprises:

an air separating primary device used for separating air into oxygen and nitrogen preliminarily;

an air separating secondary device used for further enriching a part of the oxygen which is subjected to the preliminary separation;

the boiler injection gas premixed tank is used for mixing the preliminarily separated nitrogen, the preliminarily separated part of the oxygen and/or the further enriched oxygen.

Preferably, the air separating primary device comprises an air film separating primary device, a nitrogen-rich conveying pipeline, and a first oxygen-rich conveying pipeline; the nitrogen-rich air conveying pipeline is connected with the nitrogen-rich gas pressurization monitoring tank; and the first oxygen-rich air conveying pipeline is connected with the oxygen-rich gas pressurization monitoring tank through a second oxygen-rich air conveying pipeline.

Preferably, the air separating secondary device comprises an air film separating secondary device; and the first oxygen-rich air conveying pipeline is connected with the oxygen-rich gas pressurization monitoring tank through a third oxygen-rich air conveying pipeline and the air film separating secondary device.

Preferably, the flue gas injection unit comprises a boiler connected with the boiler injection gas premixed tank through a boiler injection gas pressure stabilizer; and the flue gas outlet of the boiler is connected with the flue gas monitoring tank through the boiler flue gas conveying pipeline.

Preferably, the boiler flue gas conveying pipeline is provided with a flue gas dust remover, a flue gas dehumidifier, a flue gas desulfurization and denitrification device and a flue gas compressor.

Preferably, the thickened oil thermal production well group unit comprises a thermal production well group; the flue gas monitoring tank is connected with the thermal production well group through the thermal production well mouth injection device; and the boiler is connected with the thermal production well mouth injection device through a steam conveying pipeline.

Preferably, the produced gas recovery unit comprises a gas-liquid separation device connected with a thermal production well group; the gas-liquid separation device is also connected with a produced gas pressurization monitoring tank through a produced gas conveying pipeline; and the produced gas pressurization monitoring tank is connected with the boiler injection gas premixed tank.

Preferably, the produced gas conveying pipeline is provided with a produced gas purification device.

The working method of the CCUS system comprises the following steps:

1) Nitrogen and oxygen separation of air and premixing according to the needed proportion:

when the oxygen concentration needed by the boiler is within 20% to 60%, only putting the air film primary device into use; closing a second electromagnetic valve and a third electromagnetic valve so as to cut off a third oxygen-rich air conveying pipeline; performing primary separation on the nitrogen and the oxygen in the air by utilizing the air film separating primary device; conveying the nitrogen-rich gas after the separation to the nitrogen-rich gas pressurization monitoring tank through the nitrogen-rich air conveying pipeline; conveying the oxygen-rich gas after the separation to the oxygen-rich gas pressurization monitoring tank through the first oxygen-rich air conveying pipeline and the second oxygen-rich air conveying pipeline; arranging a first gas component monitoring module used for monitoring a nitrogen proportion in the nitrogen-rich gas pressurization monitoring tank and arranging a second gas component monitoring module used for monitoring an oxygen proportion in the oxygen-rich gas pressurization monitoring tank; adjusting a first gas mass flow meter and a second gas mass flow meter to separately control the flow of the nitrogen and that of the oxygen entering in the boiler injection gas premixed tank according to the needed oxygen concentration, and further checking whether the oxygen concentration of the boiler injection gas is at the needed concentration by a third gas component monitoring module.

2) Pressure adjustment of nitrogen and oxygen after premixing, injection and combustion in the boiler stabilizing the boiler injection gas pressure by utilizing a boiler injection gas pressure stabilizer, conveying a nitrogen and oxygen premixed gas to the boiler hearth for combustion through the boiler injection gas conveying pipeline after the pressure needed by combustion in the boiler hearth is guaranteed;

3) Monitoring, concentration adjustment and injection-production of the flue gas enabling the flue gas caused by boiler combustion to enter the flue gas dust remover, the flue gas dehumidifier and the flue gas desulfurization and denitrification device through the boiler conveying pipeline; enabling the purified flue gas to enter the flue gas monitoring tank through the flue gas compressor; monitoring the flue gas $CO_2$ enrichment ratio in the flue gas monitoring tank in real-time by the flue gas component monitoring module;

if the flue gas $CO_2$ enrichment ratio meets the optimal flue gas $CO_2$ enrichment ratio, opening a first electromagnetic valve, and enabling the flue gas into the thermal production well group through the thermal production well mouth injection device for auxiliary oil production;

if the flue gas $CO_2$ enrichment ratio does not meet the optimal flue gas $CO_2$ enrichment ratio, closing the first electromagnetic valve and opening the second electromagnetic valve, injecting the flue gas back into the boiler injection gas premixed tank, adjusting the flue gas $CO_2$ concentration by enabling the flue gas to participate in the secondary combustion of the boiler, and enabling the flue gas to enter the flue gas monitoring tank again for secondary analysis, wherein the optimal flue gas $CO_2$ enrichment ratio is determined according to an existing research method;

4) Monitoring of the liquid produced by the thermal production well group conveying the steam produced by the boiler to the thermal production well mouth injection device through the steam conveying pipeline and injecting the steam into the thermal production well group for thickened oil thermal production; performing gas-liquid separation on the produced liquid by the gas-liquid separation device in the thermal production process of the thermal production well group; enabling the obtained produced liquid to enter an oilfield manifold for oil-liquid separation; enabling the obtained produced gas to enter the produced gas purification device through the produced gas conveying pipeline to realize dehumidification and purification of the produced gas; after purification, enabling the produced gas to enter the produced gas pressurization monitoring tank; and monitoring the produced gas components by the produced gas component monitoring modules.

Preferably, in Step 1), when the needed oxygen concentration of the boiler is within 60%-100%, the air film separating secondary device is introduced while the air film separating primary device is put into use; and the second electromagnetic valve and the third electromagnetic valve are opened to enable the third oxygen-rich air conveying pipeline to realize further enrichment of the oxygen.

The advantages of the invention are as follows:

1. The formed CCUS system, compared with the traditional CCUS system and process, realizes the direct injection of boiler flue gas after purification based on real-time adjustment of the flue gas $CO_2$ enrichment ratio and greatly reduces the energy consumption in the $CO_2$ capturing link in the CCUS process as $CO_2$ capturing is changed into flue gas $CO_2$ enrichment.

2. The CCUS system determines the optimal oxygen-including concentration of the boiler injection gas based on the needed optimal flue gas $CO_2$ enrichment since a two-stage air film separation system is adopted, further realizes real-time adjustment of the oxygen-rich air oxygen concentration needed by air film separation, avoids 100% oxygen enrichment needing oxygen preparation through air film separation in a conventional oxygen-rich combustion process, and further reduces the energy consumption of the air separation oxygen preparation link.

3. The CCUS system dynamically determines the gas volumes of three gas sources which need to be re-injected into the boiler based on nitrogen-rich air by the two-stage air film separation system, boiler flue gas, component monitoring and real-time calculation of the gas produced by the thermal production well group, and further realizes precise real-time control of the boiler flue gas $CO_2$ enrichment ratio.

4. The CCUS system can realize analysis of the storage and retention of the flue gas injected in the early stage based on component monitoring of the gas produced by the thermal production well group, and can carry out gas component injection and flow adjustment through the boiler combustion when the $CO_2$ proportion in the produced gas is relatively high, can realize re-injection of the partial produced gas into the boiler and further into the thickened oil reservoir through the boiler combustion injection gas component and flow adjustment, can reduce $CO_2$ discharge and can realize underground storage.

5. The flue gas $CO_2$ optimal enrichment ratio determined at the last stage can be further optimized by utilizing the oil-water proportion of the produced liquid of the thermal production well group and the gas component monitoring of the produced gas; the flue gas $CO_2$ optimal enrichment ratio at the next stage is figured out based on an existing research method, and dynamic matching with the development situation of the thickened oil reservoir and the boiler combustion efficiency is realized.

BRIEF DESCRIPTION OF THE SEVERAL VIEWS OF THE DRAWINGS

FIG. 1 is an overall structural schematic diagram of the CCUS system;

In FIG. 1, the following components are included: the air film separation primary device 1, the air film separating secondary device 2, the first electromagnetic valve 3, the second electromagnetic valve 4, the third electromagnetic valve 5, the oxygen-rich gas pressurization monitoring tank 6, the nitrogen-rich gas pressurization monitoring tank 7, the first gas pressurization module 8, the second gas pressurization module 9, the second gas component monitoring module 10, the first gas component monitoring module 11, the third gas component monitoring module 12, the first gas mass flow meter 13, the second gas mass flow meter 14, the boiler injection gas premixed tank 15, the first exhausting valve 16, the second exhausting valve 17, the safety valve 18, the boiler injection gas pressure stabilizer 19, the boiler 20, the flue gas dust remover 21, the flue gas dehumidifier 22, the flue gas desulfurization and denitrification device 23, the flue gas compressor 24, the flue gas monitoring tank 25, the flue gas component monitoring module 26, the safety valve 27, the first electromagnetic valve 28, the second electromagnetic valve 29, the thermal production well mouth injection device 30, the thermal production well group 31, the gas-liquid separation device 32, the produced gas purification device 33, the produced gas pressurization monitoring tank 34, the produced gas component monitoring module 35, the gas pressurization module 36 and the exhausting valve 37.

A is the oxygen-rich air conveying pipeline, c is the second oxygen-rich air conveying pipeline, d is the third oxygen-rich air conveying pipeline, b is the nitrogen-rich air conveying pipeline, e is the secondary oxygen-rich air conveying pipeline, f is the secondary nitrogen air conveying pipeline, g is the boiler injection gas conveying pipeline, h is the steam conveying pipeline, I is the boiler flue gas conveying pipeline, and J is the produced gas conveying pipeline.

DETAILED DESCRIPTION OF THE INVENTION

The invention is further clarified in combination with the embodiments and the accompanying drawings of the specification, but is not limited to this.

As shown in FIG. 1.

Embodiment 1

A CCUS system for exploiting the thickened oil reservoir based on the optimal flue gas $CO_2$ enrichment ratio comprises a flue gas $CO_2$ enrichment unit, a flue gas injection unit, a thickened oil thermal production well group unit and a produced gas recovery unit;

the fuel gas $CO_2$ enrichment unit comprises an air separating enrichment unit and a boiler injection gas premixed tank 15;

the air separating enrichment unit comprises:

an air separating primary device used for separating air into oxygen and nitrogen preliminarily;

an air separating secondary device used for further enriching a part of the oxygen which is subjected to the preliminary separation;

the boiler injection gas premixed tank 15 is used for mixing the preliminarily separated nitrogen, the preliminarily separated part of the oxygen and/or the further enriched oxygen.

Embodiment 2

According to the CCUS system for exploiting the thickened oil reservoir based on the optimal flue gas $CO_2$ enrichment ratio of Embodiment 1, the difference is that the air separating primary device comprises the air film separating primary device 1, the nitrogen-rich conveying pipeline b, the first oxygen-rich conveying pipeline a; the nitrogen-rich air conveying pipeline b is connected with the nitrogen-rich gas pressurization monitoring tank 7; and the first oxygen-rich air conveying pipeline a is connected with the oxygen-rich gas pressurization monitoring tank 6 through the second oxygen-rich air conveying pipeline c.

The air separating secondary device comprises the air film separating secondary device 2; and the first oxygen-rich air conveying pipeline a is connected with the oxygen-rich gas pressurization monitoring tank 6 through the third oxygen-rich air conveying pipeline d and the air film separating secondary device 2.

Embodiment 3

According to the CCUS system for exploiting the thickened oil reservoir based on the optimal flue gas $CO_2$ enrichment ratio of Embodiment 1, the difference is that the flue gas injection unit comprises a boiler connected with the boiler injection gas premixed tank 15 through the boiler injection gas pressure stabilizer 19; and the flue gas outlet of the boiler is connected with the flue gas monitoring tank 25 through the boiler flue gas conveying pipeline I.

The boiler flue gas conveying pipeline I is provided with the flue gas dust remover 21, the flue gas dehumidifier 22, the flue gas desulfurization and denitrification device 23 and the flue gas compressor 24.

Embodiment 4

According to the CCUS system for exploiting the thickened oil reservoir based on the optimal flue gas $CO_2$ enrichment ratio of Embodiment 1, the difference is that the thickened oil thermal production well group unit comprises the thermal production well group 31; the flue gas monitoring tank 25 is connected with the thermal production well group 31 through the thermal production well mouth injection device 30; and the boiler 20 is connected with the thermal production well mouth injection device 30 through a steam conveying pipeline h.

Embodiment 5

According to the CCUS system for exploiting the thickened oil reservoir based on the optimal flue gas $CO_2$ enrichment ratio of Embodiment 1, the difference is that the produced gas recovery unit comprises a gas-liquid separation device 32 connected with a thermal production well group 31; the gas-liquid separation device 32 is also connected with a produced gas pressurization monitoring tank 34 through a produced gas conveying pipeline J; and the produced gas pressurization monitoring tank 34 is connected with the boiler injection gas premixed tank 15.

The produced gas purification device 33 is arranged at the produced gas conveying pipeline J.

Embodiment 6

The working method of the CCUS system comprises the following steps:

1) Nitrogen and oxygen separation of air and premixing according to the needed proportion:

when the oxygen concentration needed by the boiler 20 is within 20% to 60%, only putting the air film primary device 1 into use; closing the second electromagnetic valve 4 and the third electromagnetic valve 5 so as to cut off a third oxygen-rich air conveying pipeline d; performing primary separation on the nitrogen and the oxygen in the air by utilizing the air film separating primary device 1; conveying the nitrogen-rich gas after the separation to the nitrogen-rich gas pressurization monitoring tank 7 through the nitrogen-rich air conveying pipeline b; conveying the oxygen-rich gas after the separation to the oxygen-rich gas pressurization monitoring tank 6 through the first oxygen-rich air conveying pipeline a and the second oxygen-rich air conveying pipeline c; arranging a first gas component monitoring module 11 used for monitoring a nitrogen proportion at the nitrogen-rich gas pressurization monitoring tank 7 and arranging a second gas component monitoring module 10 used for monitoring an oxygen proportion at the oxygen-rich gas pressurization monitoring tank 6; adjusting the first gas mass flow meter 13 and the second gas mass flow meter 14 to separately control the flow of the nitrogen and that of the oxygen entering in the boiler injection gas premixed tank 15 according to the needed oxygen concentration, and further checking whether the oxygen concentration of the boiler injection gas is at the needed concentration by the third gas component monitoring module 12.

2) Pressure adjustment of nitrogen and oxygen after premixing, injection and combustion in the boiler stabilizing the injection gas pressure of the boiler 20 by utilizing the boiler injection gas pressure stabilizer 19, conveying the nitrogen and oxygen premixed gas to the hearth of the boiler 20 for combustion through the boiler injection gas conveying pipeline g after the pressure needed by combustion in the hearth of the boiler 20 is guaranteed;

3) Monitoring, concentration adjustment and injection-production of the flue gas enabling the flue gas caused by boiler combustion to enter the flue gas dust remover 21, the flue gas dehumidifier 22 and the flue gas desulfurization and denitrification device 23 through the boiler conveying pipeline I; enabling the purified flue gas to enter the flue gas monitoring tank 25 through the flue gas compressor 24; monitoring the flue gas $CO_2$ enrichment ratio in the flue gas monitoring tank 25 in real-time by the flue gas component monitoring module 26;

if the flue gas $CO_2$ enrichment ratio meets the optimal flue gas $CO_2$ enrichment ratio, opening the first electromagnetic valve 28, and enabling the flue gas into the thermal production well group 31 through the thermal production well mouth injection device 30 for auxiliary oil production;

if the flue gas $CO_2$ enrichment ratio does not meet the optimal flue gas $CO_2$ enrichment ratio, closing the first electromagnetic valve 28 and opening the second electromagnetic valve 29, injecting the flue gas back into the boiler injection gas premixed tank 15, adjusting the flue gas $CO_2$ concentration by enabling the flue gas to participate in the secondary combustion of the boiler 20, and enabling the flue gas to enter the flue gas monitoring tank 25 again for secondary analysis, wherein the optimal flue gas $CO_2$ enrichment ratio is determined according to the existing research method; in the embodiment, the optimal flue gas $CO_2$ enrichment ratio can be determined according to the research method below:

Horizontal well, nitrogen and viscosity reducer auxiliary steam huff and puff technology, written by Wang Xuezhong et al, and taking super-thickened oil at the shallow layer of the Junggar Basin Spring Breeze Oilfield as an example [J]. The Article, named, Oil Exploration and Development, 2013, 40(1):2-0, refers to the injection of the nitrogen in the thickened oil thermal production being able to supplement the stratum energy, the nitrogen which has relatively small intensity in the stratum layer, has a heat preservation function in an upward floating process, thereby increasing the steam thermal efficiency and increasing the crude oil recovery ratio.

$CO_2$ auxiliary steam huff and puff super-thickened oil production principle, written by Tao Lei et al, and taking the West Zheng Zone 411 of Wangzhuang Oilfield (J). The Article, named, Oil Gas Geology and Recovery Ratio, 2009(1) refers to the injection of the $CO_2$ in the thickened oil thermal production process being able to reduce the viscosity of crude oil, supplement the stratum energy, thereby increasing the crude oil flowing capacity and increasing the crude oil recovery ratio.

The natural science page of the Academic Journal of Xi'an Petroleum University 2013, 28(6): 90-94, *Research on the Dissolution Characteristics of The Flue Gas in The Thickened Oil Reservoir of the Windy City* (J). refers to, in the simulated flue gas, the CO proportion is 20% and the nitrogen proportion is 80%, and the proportion of the viscosity of crude oil can be reduced by at most 54.14% after the super-thickened oil is injected.

Based on the existing research, the flue gas has the mechanism of nitrogen and $CO_2$ for increasing the crude oil recovery ratio, but the proportion of the $CO_2$ in the flue gas, that is, the flue gas $CO_2$ enrichment ratio, has a certain relationship with an increase of the thickened oil production efficiency. For a convenient description, a formula is defined here:

$$y = f(f_{flue\ gas}, f_{CO_2}, f_{烟气}) \qquad (1)$$

wherein, y is the economic recovery ratio of the thickened oil reservoir, the function $f_{N_2}$ is the economic benefits obtained by the increased oil production after injection of the nitrogen per unit volume; function $f_{CO_2}$ is the economic benefit obtained by increased oil production after the injection of the $CO_2$ per unit volume; functional $f_{flue\ gas}$ is the economic benefit obtained by increased oil production after the injection of the $CO_2$ per unit volume; on the basis of dissolution viscosity reduction experiments of indoor flue gas, the $CO_2$, the flue gas, and the crude oil of the target thickened oil reservoir, and the numerical simulation optimization technology, optimization is carried out by utilizing the formula (1) to obtain a relation curve of the economic recovery ratio of the thickened oil reservoir, the pure nitrogen, the pure $CO_2$ gas and flue gas containing different nitrogen and $CO_2$ concentration proportions, that is, the relation curve of the economic recovery ratio and the flue gas $CO_2$ enrichment ratio;

The Article, namely, *Application Analysis of Oxygen-Enriched Combustion Technology in 150 t/h Circulating Fluidized Bedboiler (J)*, Coal Processing and Comprehensive Utilization, 2013(5):61-64, written by Ren Guoping et al, mentions that the oxygen-enriched combustion technology can increase the boiler efficiency, is energy-saving and environment-friendly. However, the energy consumption needed by the boiler efficiency improvement, boiler energy consumption reduction and separate oxygen preparation of the air film needs optimization, and for descriptive convenience, the formula is defined here:

$$Z_{boiler} f(f_{O_2}, t_{锅炉}) \qquad (2)$$

wherein, Z is the economic combustion efficiency of the boiler, the function $f_{O_2}$ is the energy consumed by preparing oxygen in different concentrations by the air film and the function $f_{boiler}$ is the boiler efficiency corresponding to inflation of oxygen at different concentration in the boiler; optimization is carried out based on the formula (2) to obtain a relationship between the economic combustion efficiency of the boiler and different oxygen concentrations; but different oxygen concentrations correspond to different proportions of nitrogen and $CO_2$ in the flue gas caused by boiler combustion, that is, the flue $CO_2$ enrichment ratio, and accordingly, the relation curve between the $CO_2$ enrichment ratio in the flue gas caused by boiler combustion and the economic combustion efficiency of the boiler is obtained through calculation of the formula (2);

Optimization is carried out through the relation curve of the economic recovery ratio of the thickened oil reservoir and the flue gas $CO_2$ enrichment ratio and the relation curve of the economic combustion efficiency of the boiler and the $CO_2$ enrichment ratio caused by boiler combustion based on the dual-goal optimization of the economic recovery ratio of the thickened oil reservoir and the economic combustion efficiency of the boiler at the lowest energy consumption in the whole process so as to obtain the flue gas $CO_2$ enrichment ratio with optimal economic combustion efficiency of the boiler and optimal economic recovery ratio of the thickened oil reservoir; and the enrichment ratio is the flue gas $CO_2$ enrichment ratio needing to be optimized in the CCUS system in which the thickened oil reservoir is exploited based on the optimal flue gas $CO_2$ enrichment ratio.

One thing to note is that the flue gas $CO_2$ enrichment ratios obtained by the needed optimization are different based on the different development modes adopted by the thickened oil reservoir thermal production, such as cyclic steam huff and puff and steam flooding, and different development stages of each development mode, such as the first turn and the second turn of the cyclic steam huff and puff, so that the dissolution viscosity reduction experiment of the indoor nitrogen, the $CO_2$, the flue gas and the target thickened oil reservoir crude oil and the numerical simulation technology used when performing optimization of the economic recovery rate and flue gas $CO_2$ enrichment ratio of the thickened oil reservoir based on the formula (1) is obtained by optimization based on the thickened oil reservoir stratum layer crude oil samples at different development stages of the thickened oil reservoir thermal production and in combination with the real-time geographical parameters of the oil reservoir obtained by monitoring the well at each stage and realizing real-time optimization of the optimal $CO_2$ enrichment ratio of the flue gas which needs to be injected at each stage, thereby guiding the overall operation of the CCUS system provided by the invention.

In the embodiment, the method of controlling the flue gas $CO_2$ enrichment ratio in real-time comprises the following steps:

the flue gas $CO_2$ enrichment ratio is adjusted to a needed range generally through two to three times of circulations of the boiler when the flue gas $CO_2$ enrichment ratio is adjusted as the flue gas injection volume is generally great when flue gas injection is carried out at an oilfield site; as the optimal flue gas $CO_2$ enrichment ratio generally floats up and down by 5%, the adjustment is relatively easy to realize, and the adjustment process can be realized rapidly (relative to the overall injection time). In addition, injection of the oil well can be stopped for a short time based on the time needed by the adjustment process when the flue gas $CO_2$ enrichment ratio adjustment is needed in the flue gas injection process, so that time matching thereof can be realized. Furthermore, the thickened oil reservoir production still gives priority to the steam injection, the flue gas $CO_2$ enrichment ratio is adjusted in real-time in the steam injection process, and enough time is taken for adjusting the flue gas $CO_2$ enrichment ratio.

4) Monitoring of the liquid produced by the thermal production well group

Conveying the steam produced by the boiler 20 to the thermal production well mouth injection device 30 through the steam conveying pipeline h and injecting the steam into the thermal production well group 31 for thickened oil thermal production; performing gas-liquid separation on the produced liquid by the gas-liquid separation device 32 in the thermal production process of the thermal production well group 31; enabling the obtained produced liquid to enter an oilfield manifold for oil-liquid separation; enabling the obtained produced gas to enter the produced gas purification device 33 through the produced gas conveying pipeline j to realize dehumidification and purification of the produced gas; enabling the produced gas after the purification to enter the produced gas pressurization monitoring tank 34; and monitoring the produced gas components by the produced gas component monitoring modules 35.

The remaining oil distribution condition of the thickened oil reservoir at the stratum layer can be calculated based on the proportion of oil and water in the produced liquid to further guide numerical simulation at the stage; the real-time oil-containing saturation of the oil reservoir is adjusted for subsequent calculation so as to realize real-time optimization of the optimal flue gas $CO_2$ enrichment ratio at the flue gas injection stage and determine the optimal flue gas $CO_2$ enrichment ratio at the next stage; the spreading condition of the flue gas injected in the early stage in the thickened oil reservoir at the stratum layer can be determined based on the produced gas components obtained by monitoring of the produced gas component monitoring module 35, and real-time optimization of the optimal flue gas $CO_2$ enrichment ratio at the subsequent flue gas injection stage is further guided to determine the optimal flue gas $CO_2$ enrichment ratio at the next stage; and when the $CO_2$ ratio in the produced gas rises, the gas pressurization module 36 and the exhausting valve 37 are controlled to be in an on/off state in real-time to re-inject the produced gas containing the high-concentration $CO_2$ gas to the boiler injection gas premixed tank 15 to participate in the adjustment of the oxygen concentration of the boiler injection gas, thereby realizing relatively low discharge of the $CO_2$ gas in the whole process and, as much as possible, enabling the $CO_2$ to be stored for increased oil production in the thickened oil reservoir at the stratum layer.

Embodiment 7

According to the working method of the CCUS system of Embodiment 6, the difference is that, in Step 1), when the needed oxygen concentration of the boiler 20 is within 60%-100%, the air film separating secondary device 2 is introduced while the air film separating primary device 1 is put into use. The second electromagnetic valve 4 and the third electromagnetic valve 5 are open for conducting the third oxygen-rich air conveying pipeline d, thereby realizing further enrichment of the oxygen.

Application Example 1

When the working method of the CCUS system of Embodiments 6 and 7 is applied to the early stage of the production of the thickened oil cyclic steam huff and puff well group of the Shengli Oilfield:

(1) the remaining oil saturation of the stratum layer is relatively high. The flue gas injection is carried out mainly for supplementation of the energy of the stratum layer in the early stage of cyclic steam huff and puff, and the flue gas injected into the stratum layer is expected to float upwards under the action of the overlapping gravity so as to form a flue gas cover layer at the upper part of the oil layer to realize oil layer heat preservation. Under the guidance of the idea, optimization is carried out by combining with dissolution, viscosity reduction and energy increase experiments of indoor flue gas with different $CO_2$ enrichment ratios and the crude oil at the stratum layer, numerical simulation optimization of the flue gas auxiliary cyclic steam huff and puff and by considering the boiler combustion efficiency, so that the optimal flue gas $CO_2$ enrichment ratio ranging from 40% to 55% at the stage is obtained.

(2) as consideration is given to the fact that the needed optimal flue gas $CO_2$ enrichment ratio is form 40% to 55%, the oxygen-rich air is prepared by only utilizing the air film separating primary device 1, the oxygen-rich air with the oxygen enrichment concentration from 45% to 60% prepared by controlling the air film separating primary device 1 is conveyed to the oxygen-rich gas pressurization monitoring tank 6, the proportion of oxygen and nitrogen in the oxygen-rich gas pressurization monitoring tank 6 is monitored in real-time by the second gas component monitoring module 10, and the proportion is fed back in real-time for adjustment of the air film separating primary device 1 to make the oxygen concentration constant within 45% to 60%;

(3) the second gas mass flow meter 14 is set, the oxygen-rich gas in the oxygen-rich pressurization monitoring tank 6 is conveyed to the boiler injection gas premixed tank 15 based on the first gas pressurization module 8, the first gas mass flow meter 13 opens according to a certain flow by referring to the proportion of oxygen and nitrogen in the oxygen-rich gas pressurization monitoring tank 6 obtained by real-time monitoring of the second gas component monitoring module 10, and the oxygen-rich gas with a specific proportion is conveyed to the boiler injection gas premixed tank 15 based on the second gas pressurization module 9 to further correct the proportion of oxygen and nitrogen in the boiler injection gas premixed tank 15, thereby controlling the proportion within a range from 45% to 60%;

(4) After the boiler injection gas pressure stabilizer 19 makes the boiler injection gas pressure constant, thereby guaranteeing the pressure needed by combustion in the hearth of the boiler 20, the boiler injection gas is conveyed to the hearth of the boiler 20 through the boiler injection gas conveying pipeline g for combustion; the steam produced by the boiler 20 is injected into the thermal production well group 31 through the well mouth injection device 30 according to the cyclic steam huff and puff injection technological parameters; the flue gas generated by the boiler 20 enters the flue gas dust remover 21, the flue gas dehumidifier 22 and the flue gas desulfurization and denitrification device 23 through the boiler flue gas conveying pipeline I for purification processing; then the flue gas enters the flue gas monitoring tank 25 through the flue gas compressor 24, and the flue gas component monitoring module 26 starts working to monitor the flue gas $CO_2$ enrichment ratio in the flue gas monitoring tank 25 at that time; if the needed optimal flue gas $CO_2$ enrichment ratio being within 40% to 55% is satisfied, the first electromagnetic valve 28 opens, the flue gas is injected into the thermal production well group 31 through the well mouth injection device 30 according to the injection technological parameters; if the optimal flue gas $CO_2$ enrichment ratio being within 40% to 55% is not satisfied, the second electromagnetic valve 29 opens, and the flue gas is re-injected into the boiler injection gas premixed tank 15, and real-time correction is carried out based on the proportion of the oxygen and the nitrogen of the injection gas of the boiler 20 fed back by the third gas component monitoring module 12 in real-time; and the first gas mass flow meter 13 and the second gas mass flow meter 14 are adjusted synchronously to guarantee that the boiler flue gas generated after the secondary circulatory combustion can reach the optimal range of the flue gas $CO_2$ enrichment ratio;

(5) after the thermal production well group 31 is closed for a certain time, production is carried out; the output liquid of the thermal production well group 31 is subjected to gas-liquid separation based on the gas-liquid separation device 32; the produced gas obtained by separation is conveyed to the produced gas purification device 33 through the produced gas conveying pipeline J for produced gas dehumidification and purification; the dehumidified and purified gas then enters the produced gas pressurization monitoring tank 34; and the gas component monitoring module 35 starts working to monitor the produced gas components, and the produced gas is pressurized by the gas pressurization module 36 and can be re-injected into the boiler injection gas premixed tank 15 to produce gas reutilization and recirculation assistant combustion.

Application Example 2

When the working method of the CCUS system of Embodiments 6 and 7 is applied to the cyclic steam huff and puff middle stage of the thickened oil cyclic steam huff and puff well group of the Shengli Oilfield:

(1) the remaining oil saturation of the stratum layer is further reduced at the moment, the flue gas injected in the early stage floats upwards to form the cover layer under the action of the overlapping gravity, and the viscosity reduction degree of the steam injected in the early stage is kept at a certain level. At the moment, the proportion of the $CO_2$ in the injected flue gas is expected to be improved to realize dissolution and viscosity reduction of the $CO_2$ in the crude oil and further increase the energy of the stratum layer. Therefore, optimization is carried out by combining with dissolution, viscosity reduction, and the energy increase experiments of indoor flue gas with different $CO_2$ enrichment ratios and the crude oil at the stratum layer, numerical simulation optimization of the flue gas auxiliary cyclic steam huff and puff and by considering the boiler combustion efficiency, so that the optimal flue gas $CO_2$ enrichment ratio ranging from 70% to 80% at the stage is obtained;

(2) at the moment, it is necessary to open the air film separating secondary device 2, and the film components of the device 2 are controlled to prepare the secondary oxygen-rich air, so that the oxygen concentration is controlled within 80%-85%; then the oxygen-rich air prepared by the two-stage air film separating device with a controllable injection proportion is mixed and conveyed to the oxygen-rich gas pressurization monitoring tank 6, and the second gas component monitoring module 10 opens to monitor the oxygen concentration in the oxygen-rich gas pressurization monitoring tank 6 in real-time; the oxygen concentration is fed back to the air film separating secondary device 2 to further adjust the concentration of the oxygen in the secondary oxygen-rich air;

(3) in combination with the oxygen concentration in the boiler injection gas premixed tank 15 measured in real-time by the third gas component monitoring module 12, the first gas mass flow meter 13 and the second gas mass flow meter 14 are controlled to further adjust the oxygen concentration in the boiler injection gas premixed tank 15; after the boiler injection gas pressure stabilizer 19 makes the boiler injection gas pressure constant, thereby guaranteeing the pressure needed by combustion in the hearth of the boiler 20, the boiler injection gas is conveyed to the hearth of the boiler 20 through the boiler injection gas conveying pipeline g for combustion; the steam produced by the boiler 20 is injected into the thermal production well group 31 through the well mouth injection device 30 according to the cyclic steam huff and puff injection technological parameters; the flue gas generated by the boiler 20 enters the flue gas dust remover 21, the flue gas dehumidifier 22 and the flue gas desulfurization and denitrification device 23 through the boiler flue gas conveying pipeline I for purification processing; then the flue gas enters the flue gas monitoring tank 25 through the flue gas compressor 24, and the flue gas component monitoring module 26 starts working to monitor the flue gas $CO_2$ enrichment ratio in the flue gas monitoring tank 25 at the moment; if the needed optimal flue gas $CO_2$ enrichment ratio being within 70% to 80% is satisfied, the first electromagnetic valve 28 opens, the flue gas is injected into the thermal production well group 31 through the well mouth injection device 30 according to the injection technological parameters; if the optimal flue gas $CO_2$ enrichment ratio being within 70% to 80% is not satisfied, the second electromagnetic valve 29 opens, and the flue gas is re-injected into the boiler injection gas premixed tank 15, and real-time correction is carried out based on the proportion of the oxygen and the nitrogen of the injection gas of the boiler fed back by the third gas component monitoring module 12 in real-time, and the first gas mass flow meter 13 and the second gas mass flow meter 14 are adjusted synchronously to guarantee that the boiler flue gas generated after the secondary circulatory combustion can reach the optimal range of the flue gas $CO_2$ enrichment ratio;

(4) after the thermal production well group 31 is closed for a certain time, production is carried out; the output liquid of the thermal production well group 31 is subjected to gas-liquid separation based on the gas-liquid separation device 32; the produced gas obtained by separation is conveyed to the produced gas purification device 33 through the produced gas conveying pipeline J for produced gas dehumidification and purification; the dehumidified and purified gas then enters the produced gas pressurization monitoring tank 34; and the gas component monitoring module 35 starts working for monitoring the produced gas components, and the produced gas is pressurized by the gas pressurization module 36 and can be re-injected into the boiler injection gas premixed tank 15 for produced gas reutilization and recirculation assistant combustion.

What is claimed is:

1. A CCUS (Carbon Capture Utilization & Storage) system for exploiting a thickened oil reservoir based on an optimal flue gas $CO_2$ enrichment ratio, characterized by comprising a flue gas $CO_2$ enrichment unit, a flue gas injection unit, a thickened oil thermal production well group unit and a produced gas recovery unit;

the flue gas $CO_2$ enrichment unit comprises an air separating enrichment unit and a boiler injection gas premixed tank;

the flue gas injection unit comprises a boiler connected with the boiler injection gas premixed tank through a boiler injection gas pressure stabilizer; and a flue gas outlet of the boiler is connected with a flue gas monitoring tank through a boiler flue gas conveying pipeline;

the air separating enrichment unit comprises an air separating primary device used for separating air into oxygen and nitrogen preliminarily; and an air separating secondary device used for further enriching a part of the oxygen which is subjected to the preliminary separation; and the boiler injection gas premixed tank is used for mixing the preliminarily separated nitrogen, the preliminarily separated part of the oxygen and/or the further enriched oxygen;

wherein the air separating primary device comprises an air film separating primary device, a nitrogen-rich conveying pipeline, a first oxygen-rich conveying pipeline; a nitrogen-rich air conveying pipeline is connected with a nitrogen-rich gas pressurization monitoring tank; and a first oxygen-rich air conveying pipeline is connected with an oxygen-rich gas pressurization monitoring tank through a second oxygen-rich air conveying pipeline.

2. The CCUS system for exploiting a thickened oil reservoir based on the optimal flue gas $CO_2$ enrichment ratio of claim 1, wherein the air separating secondary device comprises an air film separating secondary device; and the first oxygen-rich air conveying pipeline is connected with the oxygen-rich gas pressurization monitoring tank through a third oxygen-rich air conveying pipeline and the air film separating secondary device.

3. The CCUS system for exploiting a thickened oil reservoir based on the optimal flue gas $CO_2$ enrichment ratio of claim 1, wherein the boiler flue gas conveying pipeline is provided with a flue gas dust remover, a flue gas dehumidifier, a flue gas desulfurization and denitrification device and a flue gas compressor.

4. The CCUS system for exploiting a thickened oil reservoir based on the optimal flue gas $CO_2$ enrichment ratio of claim 1, wherein the thickened oil thermal production well group unit comprises a thermal production well group; the flue gas monitoring tank is connected with the thermal production well group through a thermal production well mouth injection device; and the boiler is connected with the thermal production well mouth injection device through a steam conveying pipeline.

5. The CCUS system for exploiting a thickened oil reservoir based on the optimal flue gas $CO_2$ enrichment ratio of claim 1, wherein the produced gas recovery unit comprises a gas-liquid separation device connected with the thermal production well group; the gas-liquid separation device is also connected with a produced gas pressurization monitoring tank through a produced gas conveying pipeline; and the produced gas pressurization monitoring tank is connected with the boiler injection gas premixed tank.

6. The CCUS system for exploiting a thickened oil reservoir based on the optimal flue gas $CO_2$ enrichment ratio of claim 5, wherein the produced gas conveying pipeline is provided with a produced gas purification device.

7. A working method of the CCUS system of claim 1, characterized by comprising steps below:
1) nitrogen and oxygen separation of air and premixing according to a needed proportion comprising:
when the oxygen concentration needed by the boiler is within 20% to 60%, only putting an air film primary device into use; performing primary separation on nitrogen and oxygen in the air by utilizing the air film separating primary device; conveying the nitrogen-rich gas after the separation to the nitrogen-rich gas pressurization monitoring tank through the nitrogen-rich air conveying pipeline; conveying the oxygen-rich gas after the separation to the oxygen-rich gas pressurization monitoring tank through the first oxygen-rich air conveying pipeline and the second oxygen-rich air conveying pipeline; arranging a first gas component monitoring module used for monitoring a nitrogen proportion at the nitrogen-rich gas pressurization monitoring tank and arranging a second gas component monitoring module used for monitoring an oxygen proportion at the oxygen-rich gas pressurization monitoring tank; adjusting a first gas mass flow meter and a second gas mass flow meter to separately control the flow of the nitrogen and that of the oxygen entering in the boiler injection gas premixed tank according to the needed oxygen concentration, and further checking whether the oxygen concentration of the boiler injection gas is at the needed concentration by a third gas component monitoring module;
2) pressure adjustment of nitrogen and oxygen after premixing, injection, and combustion in the boiler comprising:
stabilizing the boiler injection gas pressure by utilizing the boiler injection gas pressure stabilizer, conveying a nitrogen and oxygen premixed gas to a boiler hearth for combustion through the boiler injection gas conveying pipeline after the pressure needed by combustion in the boiler hearth is guaranteed;
3) monitoring, concentration adjustment, and injection-production of the flue gas comprising:
enabling the flue gas caused by boiler combustion to enter a flue gas dust remover, a flue gas dehumidifier and a flue gas desulfurization and denitrification device through a boiler conveying pipeline; enabling the purified flue gas to enter the flue gas monitoring tank through a flue gas compressor; monitoring the flue gas $CO_2$ enrichment ratio in the flue gas monitoring tank in real-time by a flue gas component monitoring module;
if the flue gas $CO_2$ enrichment ratio meets the optimal flue gas $CO_2$ enrichment ratio, opening a first electromagnetic valve, and enabling the flue gas into a thermal production well group through a thermal production well mouth injection device for auxiliary oil production; and
if the flue gas $CO_2$ enrichment ratio does not meet the optimal flue gas $CO_2$ enrichment ratio, closing the first electromagnetic valve and opening a second electromagnetic valve, injecting the flue gas back into the boiler injection gas premixed tank, adjusting the flue gas $CO_2$ concentration by enabling the flue gas to participate in the secondary combustion of the boiler, and enabling the flue gas to enter the flue gas monitoring tank again for secondary analysis;
4) monitoring of produced liquid of the thermal production well group comprising:
conveying steam produced by the boiler to the thermal production well mouth injection device through the steam conveying pipeline and injecting the steam into the thermal production well group for thickened oil thermal production; performing gas-liquid separation on the produced liquid by the gas-liquid separation device in the thermal production process of the thermal production well group; enabling the obtained produced liquid to enter an oilfield manifold for oil-liquid separation; enabling the obtained produced gas to enter the produced gas purification device through the produced gas conveying pipeline to realize dehumidification and purification of the produced gas; enabling the produced gas after the purification to enter the produced gas pressurization monitoring tank, and monitoring the produced gas components by the produced gas component monitoring modules.

8. A working method of the CCUS system of claim 7, wherein, in Step 1), when the needed oxygen concentration of the boiler is within 60%-100%, the air film separating secondary device is introduced while the air separating primary device is put into use.

* * * * *